United States Patent
Tabet et al.

(10) Patent No.: US 9,374,191 B2
(45) Date of Patent: *Jun. 21, 2016

(54) OUTER LOOP LINK ADAPTATION FOR DEVICE RESUMPTION

(75) Inventors: Tarik Tabet, Los Gatos, CA (US); Paul V. Flynn, Menlo Park, CA (US); Syed A. Mujtaba, Santa Clara, CA (US); Navid Damji, Cupertino, CA (US); Zhu Ji, San Jose, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 608 days.

This patent is subject to a terminal disclaimer.

(21) Appl. No.: 13/606,051

(22) Filed: Sep. 7, 2012

(65) Prior Publication Data
US 2013/0310091 A1 Nov. 21, 2013

Related U.S. Application Data

(60) Provisional application No. 61/648,523, filed on May 17, 2012.

(51) Int. Cl.
*H04B 1/00* (2006.01)
*H04B 7/00* (2006.01)
(Continued)

(52) U.S. Cl.
CPC .............. *H04L 1/0003* (2013.01); *Y02B 60/31* (2013.01)

(58) Field of Classification Search
CPC ..... H04W 52/12; H04W 52/20; H04W 52/24; H04W 52/42; H04W 52/44; H04W 52/50; H04W 52/143; H04W 52/225; H04W 52/241; H04W 52/282; H04W 52/288; H04W 52/367; H04W 52/221; H04W 52/223; H04W 52/226; H04W 52/228; H04W 72/12; H04W 52/22; H04W 74/004; H04W 74/006; H04W 76/028; H04L 1/0003; H04L 1/0006; H04L 1/0009; H04L 1/0025; H04L 1/0017; H04L 1/20; H04L 1/24; H04L 25/0242; H04L 25/03343; H04L 25/2601; H04L 25/261; H04L 27/2647; H04L 1/0016; H04B 7/0417; H04B 7/0608; H04B 7/0669; H04B 7/0697; H04B 7/0814; H04B 7/0854; H04B 17/006; H04B 1/1027; H04B 7/04; H04B 7/17; H04B 7/06; H04B 7/08; H03M 13/033; H03M 13/1102
USPC ............ 455/13.4, 277.1, 453.2, 501, 522, 69, 455/670, 114.2, 114.3, 135, 222, 223, 455/227.2, 278.1; 370/203, 208, 210, 252, 370/335; 375/219, 260, 296; 714/752, 786
See application file for complete search history.

(56) References Cited

U.S. PATENT DOCUMENTS 6,341,224 B1 * 1/2002 Dohi et al. .................... 455/522
6,459,901 B1 * 10/2002 Chawla ................. H04W 72/04
370/341
(Continued)

FOREIGN PATENT DOCUMENTS

EP 2451206 5/2012
KR 20060134458 12/2006
(Continued)

OTHER PUBLICATIONS

Office Action from Taiwanese Application No. 102117422, mailed Oct. 22, 2014, English and Chinese versions, pp. 1-21.
(Continued)

*Primary Examiner* — Yuwen Pan
*Assistant Examiner* — Paul P Tran
(74) *Attorney, Agent, or Firm* — Meyertons Hood Kivlin Kowert & Goetzel, P.C.; Jeffrey C. Hood; Joel L. Stevens

(57) ABSTRACT

Outer loop link adaptation for device resumption. A user equipment (UE) and base station (BS) may be in communication in a first network (e.g., an LTE network). Communication between the UE and the BS may be interrupted, e.g., due to a long fading environment, the UE tuning away to a second network (e.g., a CDMA network). Accordingly, the measured error rate may increase dramatically. After resumption from the interruption, a negative offset may be applied to a reported SINR value from the UE due to the previous increase in error rate. Upon improvement in the error rate, a larger, positive offset adjustment may be added to the negative offset, allowing the estimated SINR to return to reported SINR more quickly. Additionally, the error rate estimation may be adjusted to converge to a more recently measured more quickly by decreasing a feedback filter coefficient.

20 Claims, 9 Drawing Sheets

(51) Int. Cl.

| | | |
|---|---|---|
| *H04W 72/00* | (2009.01) |
| *H04M 1/00* | (2006.01) |
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04W 4/00* | (2009.01) |
| *H04B 7/216* | (2006.01) |
| *H04B 1/38* | (2015.01) |
| *H04L 5/16* | (2006.01) |
| *H03M 13/00* | (2006.01) |

(56) References Cited

U.S. PATENT DOCUMENTS

| | | | |
|---|---|---|---|
| 6,526,261 B1* | 2/2003 | Takeuchi et al. | 455/69 |
| 6,862,458 B2* | 3/2005 | Kanemoto et al. | 455/522 |
| 7,043,199 B2 | 5/2006 | Dai et al. | |
| 7,522,561 B2* | 4/2009 | Yano | H04W 52/12 370/333 |
| 8,014,744 B1 | 9/2011 | Kopikare et al. | |
| 8,160,027 B2* | 4/2012 | Malladi | H04W 52/12 370/318 |
| 8,209,580 B1 | 6/2012 | Varnica et al. | |
| 8,472,382 B1* | 6/2013 | Vargantwar | 370/328 |
| 2003/0083082 A1* | 5/2003 | Lundby | H04W 52/12 455/501 |
| 2007/0047499 A1 | 3/2007 | Montojo et al. | |
| 2008/0240216 A1 | 10/2008 | Kolding et al. | |
| 2012/0257664 A1* | 10/2012 | Yue et al. | 375/227 |

FOREIGN PATENT DOCUMENTS

| | | |
|---|---|---|
| WO | 2004038986 A2 | 5/2004 |
| WO | 2009078762 | 6/2009 |

OTHER PUBLICATIONS

International Preliminary Report on Patentability from PCT/US2013/039054, issued Nov. 27, 2014, Apple Inc., pp. 1-8.

* cited by examiner

| CQI Index | Modulation | Code Rate x 1024 | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

*FIG. 4*

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

*FIG. 5*

OUTER LOOP LINK ADAPTATION FOR DEVICE RESUMPTION

PRIORITY CLAIM

The present application claims benefit of priority to U.S. Provisional Application No. 61/648,523 titled "Outer Loop Link Adaptation for Device Resumption" and filed on May 17, 2012, whose inventors are Tarik Tabet, Paul V. Flynn, Syed A. Mujtaba, Navid Damji, Zhu Ji, and Sreevalsan Vallath, and which is hereby incorporated by reference in its entirety as thought fully and completely set forth herein.

FIELD OF THE INVENTION

The present application relates to wireless communication, and more particularly to a system and method for outer loop link adaptation for device resumption.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

Link adaptation in wireless networks is used to select the appropriate modulation, coding scheme and power to achieve a target Quality of Service (QoS) and Block Error Rate (BLER). In order to accomplish link adaptation, the UE generates and reports Channel State Feedback (CSF), which includes a Channel Quality Indicator (CQI), to the base station to provide information regarding the state or conditions of the downlink channel. The base station then uses the reported CQI and the estimated BLER to map the reported CQI to a given modulation and coding scheme (MCS) combination. This mapping is known as outer loop link adaptation.

Some present wireless communication devices (e.g., cell phones) use a single radio for two or more wireless communication networks, e.g., a first network using LTE and a second network using CDMA. In such systems, the wireless communication device may periodically tune from the first network to the second network, e.g., to listen to a paging channel. In such cases, measured error rates or channel quality indicators (CQIs) may be measured as very high (e.g., 100% error rate since an absence of ACk/NACK messages received at the network (NW) is translated as a failure of the downlink (DL) transmission) or poor, respectively. Similar cases can occur in long fade environments, where interrupted communication with the first network can cause an out of sync situation. When these communication interruptions occur, the high error rates may result in a poorly selected modulation and coding scheme, e.g., since it is based on an interrupted channel rather than actual channel conditions (missed CQI reports).

Thus, when the UE tunes away or experiences a long fade, the estimated BLER grows to a large value. When the UE returns to the network, its MCS allocation is penalized even though it may be providing repeated good CQI reports. The MCS allocation of the UE may remain penalized in situations where the base station is using historical BLER estimates as an input to determine the MCS. This will have an impact on the downlink (DL) throughput of the UE. It would be desirable to lessen the DL throughput penalty due to the BLER level that occurred during the tune-away or fade.

Accordingly, improvements in wireless communication are desired.

SUMMARY OF THE INVENTION

Various embodiments are described of outer loop link adaptation for device resumption.

Initially, a user equipment (UE) and base station (BS) may be in communication in a first network (e.g., an LTE network). During this period, the UE may provide a reported SINR value to the BS via a channel quality indicator (CQI). Additionally, the BS may determine an error rate based on ACKs and/or NACKs received from the UE. As one example, instead of using an instantaneous block error rate (BLER) value, e.g., instead of using a 1 if no acknowledge (NACK) is received and a 0 if an acknowledge is received, the BS may use a window averaged BLER, which corresponds to a short term average of the block error rate. The BS may use this window averaged block error rate (also referred to as historical error rate) to establish an offset to apply to the reported SINR. The offset may be adjusted up or down as the error rate varies from a target rate (e.g., 10%).

Later, communication between the UE and the BS may be interrupted, e.g., due to a long fading environment, the UE tuning away to a second network (e.g., a CDMA network), etc. Accordingly, during this interruption, the UE may not provide any ACKs and/or NACKs to the BS, resulting in an increase in the estimated error rate. Accordingly, the offset may be decreased to a negative number (e.g., −6 dB).

After resumption from the interruption, the negative offset established above may be applied to a reported SINR value from the UE due to the previous increase in historical error rate. Upon improvement in the historical error rate (from the resumption), a larger, positive offset adjustment may be added to the negative offset, allowing the estimated SINR to return to reported SINR more quickly. Additionally, the error rate estimation may be adjusted to converge to a more recently measured value more quickly by decreasing a forgetting factor or filter coefficient of a filter used in estimating the error rate. Thus the offset may be more quickly decreased, thereby providing improved operation of the UE device.

An embodiment of the invention may also compute a historical (or averaged) error rate which involves the current error and the immediately preceding error value and may apply different levels of a smoothing factor for more efficient operation. More specifically, the method may multiply the prior error value by a term alpha and the current error rate by 1-alpha. The term "alpha" is referred to herein as a smoothing factor. For the value of the current error rate, instead of using an instantaneous block error rate (BLER) value, e.g., instead of using a 1 if no acknowledge (NACK) is received and a 0 if an acknowledge is received, the base station may use a window averaged BLER for the new or current error value, which corresponds to a short term average of the block error rate. Thus the method may multiply the prior BLER value by a term alpha and this short term averaged (or window averaged) BLER by 1-alpha. The base station may use this resulting historical (and window averaged) block error rate (referred to herein as a historical error rate) to establish the appropriate modulation and coding schemes used by the BS for the respective UE. In particular, the method may adjust the smoothing factor after a tune-away occurs to allow the historical error rate (historical BLER) to more quickly converge to the proper value.

BRIEF DESCRIPTION OF THE DRAWINGS

A better understanding of the present invention can be obtained when the following detailed description of the embodiments is considered in conjunction with the following drawings.

FIG. 4 illustrates an exemplary table of CQI values according to one embodiment of the invention;

FIG. 5 illustrates an exemplary table of modulation and coding schemes which may be used in determining CQI values, according to one embodiment;

Figure 1A:
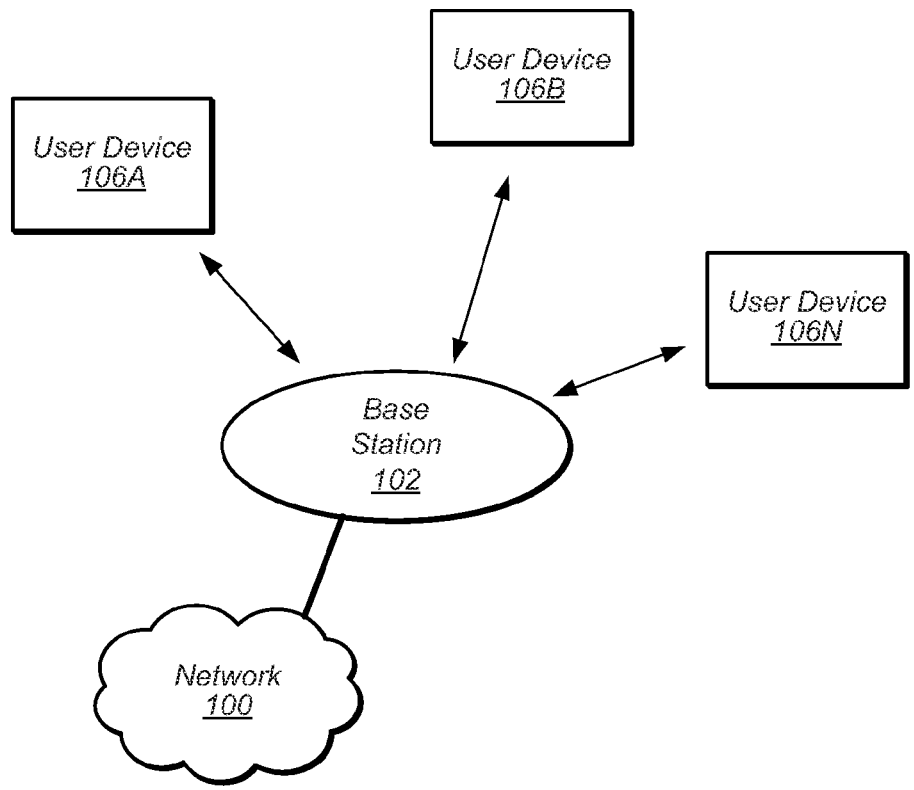
FIG. 1A illustrates an exemplary wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present patent application:

BLER: Block Error Rate (same as Packet Error Rate)
BER: Bit Error Rate
CRC: Cyclic Redundancy Check
DL: Downlink
PER: Packet Error Rate
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System
Terms The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
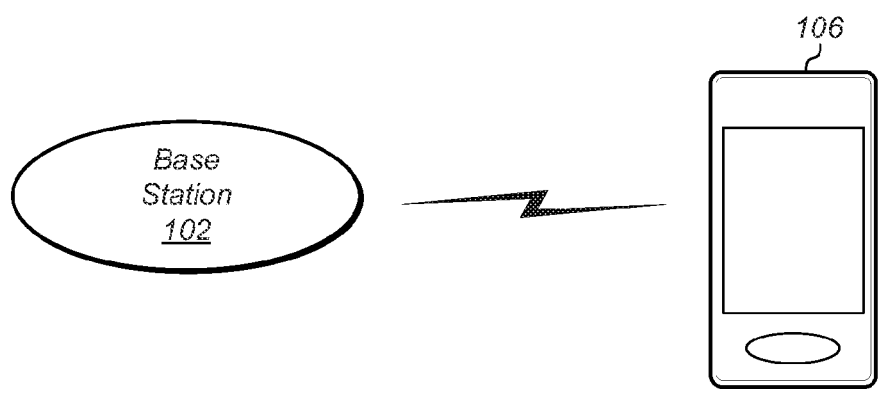
FIG. 1B illustrates a base station 102 in communication with user equipment 106.

FIGS. 1A and 1B—Communication System

FIG. 1A illustrates an exemplary (and simplified) wireless communication system. It is noted that the system of FIG. 1A is merely one example of a possible system, and embodiments of the invention may be implemented in any of various systems, as desired.

As shown, the exemplary wireless communication system includes a base station 102 which communicates over a transmission medium with one or more User Equipment (UE) (or "UE devices") 106A through 106N.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc.

FIG. 1B illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE may perform any of the embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

In some embodiments, the UE 106 may be configured to generate channel state information (CSI) that are provided back to the base station (BS) 102. The base station 102 may use CSI to adjust its communications with the respective UE 106, or possibly other UEs 106. For example, in one embodiment the base station 102 may receive and utilize CSI from multiple UEs 106 to adjust its communication scheduling among the various UEs within its coverage area (or cell).

As discussed herein, various adjustments may be performed in generating channel quality indicator(s) (CQIs) of the CSI by the UE 106 or by the BS 102 to the received information in the CSI. Moreover, while many of the embodiments below are primarily directed to the operation and adjustment at the BS 102, similar adjustments may be performed on the UE 106 side.

Figure 2:
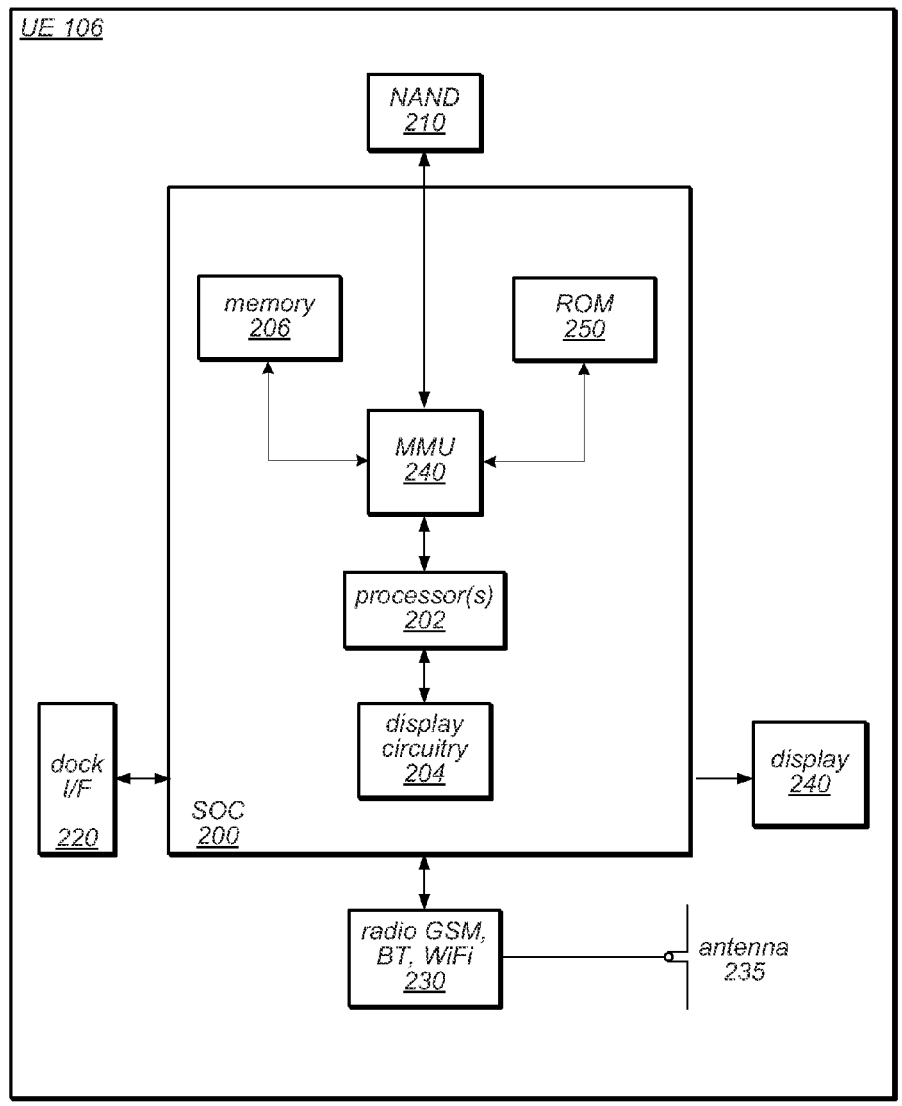
FIG. 2 illustrates an exemplary block diagram of a UE 106, according to one embodiment.

FIG. 2—Exemplary Block Diagram of a UE

FIG. 2 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. The MMU 240 may be configured to perform memory protection and page table translation or set up. In some embodiments, the MMU 240 may be included as a portion of the processor(s) 202.

As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry 230 (e.g., for GSM, Bluetooth, WiFi, etc.) which may use antenna 235 to perform the wireless communication. In one embodiment, a single radio may be used to communicate with multiple networks (e.g., LTE and CDMA networks, among other types). The radio may periodically tune away from a first network (e.g., an LTE network) to listen to a paging channel of a second network (e.g., a CDMA network). Embodiments described herein may be particularly useful during such times.

Additionally, the UE 106 may include hardware and software components for generating and/or providing CQI values (e.g., for CSI) to a base station.

Figure 3:
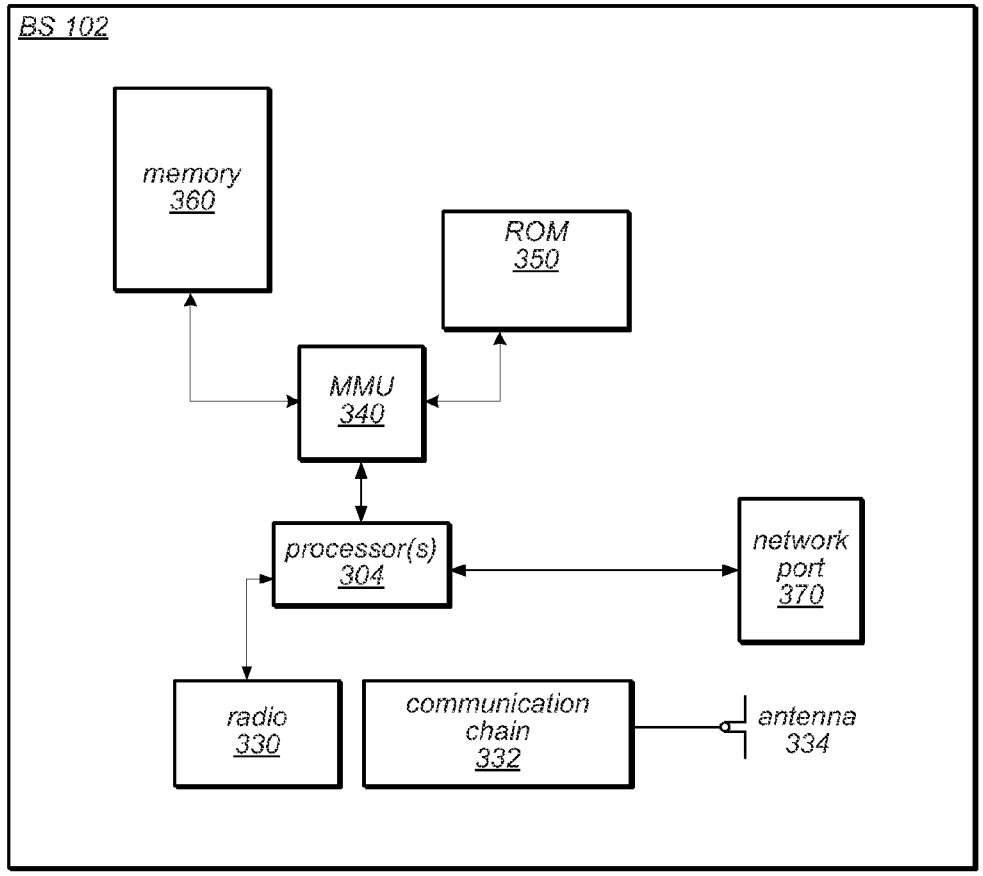
FIG. 3 illustrates an exemplary block diagram of a BS 102, according to one embodiment.

FIG. 3—Base Station

FIG. 3 illustrates an exemplary block diagram of a base station 102. It is noted that the base station of FIG. 3 is merely one example of a possible base station. As shown, the base station 102 may include processor(s) 304 which may execute program instructions for the base station 102. The processor(s) 102 may also be coupled to memory management unit (MMU) 340, which may be configured to receive addresses from the processor(s) 102 and translate those addresses to locations in memory (e.g., memory 360 and read only memory (ROM) 350) or to other circuits or devices.

The base station 102 may include at least one network port 370. The network port 370 may be configured to couple to a telephone network and provide a plurality of devices, such as UE devices 106, access to the telephone network as described above in FIGS. 1A and 1B.

The base station 102 may include at least one antenna 334. The at least one antenna 334 may be configured to operate as a wireless transceiver and may be further configured to communicate with UE devices 106 via radio 330. The antenna 334 communicates with the radio 330 via communication chain 332. Communication chain 332 may be a receive chain, a transmit chain or both. The radio 330 may be configured to communicate via various wireless telecommunication standards, including, but not limited to, LTE, CDMA, etc.

The processor 304 of the base station 102 may be configured to implement part or all of the methods described herein, e.g., by executing program instructions stored on a memory medium (e.g., a non-transitory computer-readable memory medium). Alternatively, the processor 304 may be configured as a programmable hardware element, such as an FPGA (Field Programmable Gate Array), or as an ASIC (Application Specific Integrated Circuit), or a combination thereof.

Exemplary Details Regarding CSI

In LTE, the CSI may include the following three components: channel quality indicator (CQI), precoding matrix index (PMI), and rank indication (RI). The CSI may be provided from the UE to the BS.

Within LTE, CQI is defined as follows: Based on an unrestricted observation interval in time and frequency, the UE derives for each CQI value reported in uplink subframe n the highest CQI index between 1 and 15 in the Table shown in FIG. 4 which satisfies the following condition, or CQI index 0 if CQI index 1 does not satisfy the condition: A single PDSCH transport block with a combination of modulation scheme and transport block size corresponding to the CQI index, and occupying a group of downlink physical resource blocks termed the CQI reference resource, could be received with a transport block error probability not exceeding 0.1. Note that the table of FIG. 3 may be modified to correspond to SINR instead of efficiency, as desired.

Within LTE, PMI is defined as the precoding matrix index that the UE can feedback to the BS for its selection of precoding matrix to optimize the throughput. In one embodiment, the UE may determine the optimal PMI based on its channel estimation and calculates the expected throughput with available hypotheses of precoding matrices.

Within LTE, RI is defined as the rank indicator that signals the BS the number of transmission layers the UE can support to optimize throughput.

In LTE, the modulation and coding schemes (MCSs) are defined to allow different levels of coding rates and modulation orders such as in the table of FIG. 5 for DL physical downlink shared channel (PDSCH). The TBS index may be used in transport block size tables. This table may be used by the UE and/or BS for selection of MCSs.

Based on the description of the CQI definition for LTE, from the UE perspective, it is desirable to achieve the 10% BLER target for any CQI given the DL configuration. Additionally, the scheduling algorithm in the BS may be designed according to this UE requirement to increase throughput.

Note that what is proposed in LTE specification is one way of reporting and using CQI for optimizing the receiver throughput, which sets a fixed BLER target for the UE that can simplify the optimization at the BS. However, in order to further increase efficiency, an adaptive BLER target can be used based on the UE channel conditions and network scenarios. Note that in the rest of the discussion, embodiments will be directed to those with the fixed BLER target for CQI, but the procedure can be generalized to varying BLER targets for CQI. Note that for MIMO transmissions, multiple hypotheses of the precoding matrices and rank selection (the number of spatial layers) can be tried by the UE to determine the optimal precoding matrix index (PMI) and rank indication (RI).

Figure 6:
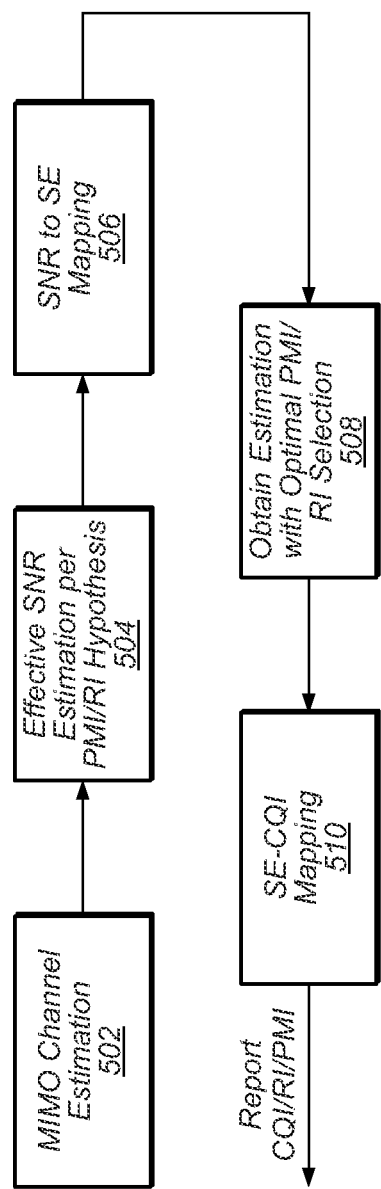
FIG. 6 illustrates an exemplary method for providing CSI, according to one embodiment.

FIG. 6—Exemplary CQI Calculation

FIG. 6 illustrates a method performed by UE 106 for generating channel quality indicators. The method of FIG. 6 may generate a CQI that is based on the current conditions that is being experienced by the UE 106. The method shown in FIG. 6 may be used in conjunction with any of the computer systems or devices shown in the Figures, among other devices. In various embodiments, some of the method elements shown may be performed concurrently, in a different order than shown, or may be omitted. Additional method elements may also be performed as desired. As shown, the method of FIG. 6 may operate as follows.

In 502, MIMO channel estimation and/or noise estimation may be performed. In one embodiment, the channel estimation may be used to generate a whitened channel estimation matrix for CQI calculation.

In 504, effective SNR estimation per PMI/RI Hypothesis may be determined. In one embodiment, the SNR estimation may be based on the whitened channel estimation and the receiver algorithm. Generally speaking, there are several types of receiver demodulation algorithms including LMMSE (linear minimum mean square error), MLM (maximum likelihood method), and LMMSE-SIC (LMMSE with serial interference cancellation), among others.

In 506, the estimated SNR value may be mapped to an estimated spectral efficiency (SE) metric, e.g., using an SNR to SE mapping table. This mapping may be based on the channel capacity and possible loss due to practical receivers. Note that the SE estimation can be done in a finer granularity on a small number of resource blocks (e.g., two RBs). In one embodiment, the SE may be further processed, e.g., involving averaging across wideband, filtered over time, etc.

In 508, an estimation with the optimal PMI/RI (precoding matrix index/rank index) selection may be performed. The PMI/RI may be related to MIMO transmissions and may indicate the number of layers of transmission in MIMO scenarios. In one embodiment, the UE can use its channel estimation to determine the best PMI & RI and feedback to BS for it to apply at the BS side. In general, these values may be calculated along with CQIs, and conceptually, they are all part of CSI. In the context of LTE, the channel quality feedback may report CQI, PMI and RI separately.

In 510, SE to CQI mapping may be performed to determine the CQI, e.g., using an SE-CQI mapping table. The SE-CQI mapping table may be selected based on the current communication scenario as noted above. The CQI and/or RI/PMI values may then be reported. Note that CQIs may include any of various channel quality feedback indications. For example, the term "CQI" may generally include RI/PMI values as well as the channel quality for BS to select a proper code rate (MCS). Thus, discussions above regarding CQI may include one or more values, including RI/PMI values. In this specific instance, the channel quality, RI, and PMI values are provided in the CSI.

Generally, filtering the SE may be important for CQI/PMI/RI reporting and may reflect how fast the UE responds to the channel or related spectral efficiency changes. In one embodiment, the filtering mechanisms may include FIR or IIR. FIR filtering generally has a fixed length of memory and is a weighted sum of previous SE estimation. An IIR filter generally has a memory of infinite length with the impact of each sample exponentially decreasing, which typically provides a smooth weighted average across the time. A simple IIR filter would be a single-pole IIR filter and the time constant can be approximated as the inverse of the IIR filter coefficient.

Furthermore, the CSI requested by the BS may include a wide-band (WB) or M-subband report. The WB report may require the UE to report an averaged WB estimation of CQI. The M-subband CQI report mode specifies the UE to report the subband CQIs on M different subbands with a defined number of RBs (in LTE, each RB may contain 12 tones with 180 kHz bandwidth). In order to respond to different CQI report mode, the SE averaging or filtering may need to be performed in the frequency domain accordingly.

Figure 7:
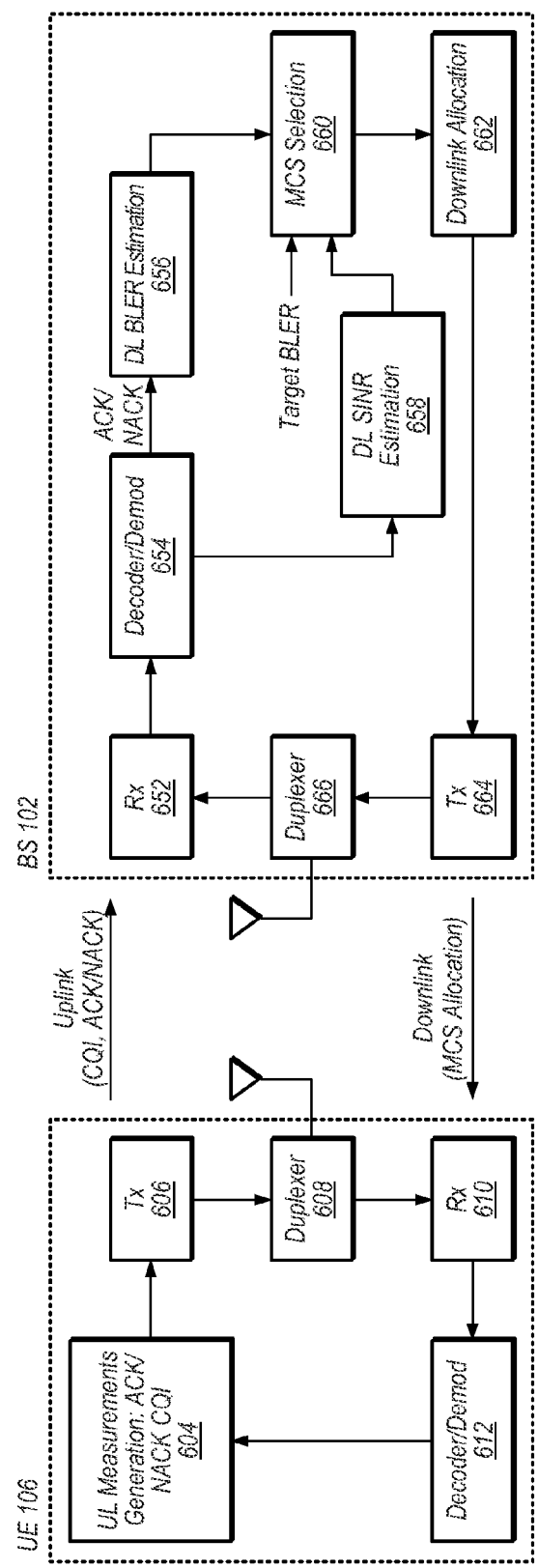
FIG. 7 illustrates an exemplary block diagram illustrating operation of a UE and a BS, according to one embodiment.

FIG. 7—Exemplary Block Diagram of UE and BS

FIG. 7 illustrates an exemplary block diagram showing interaction between the UE 106 and BS 102. More specifically, as shown, the UE 106 may be configured to perform various link measurement generation, e.g., ACK, NACK, CSI (e.g., including CQI, PMI, RI, etc.) using measurement block 604. These measurements may be provided to the base station via transmission (Tx) circuitry 606, e.g., as selected by the duplexer 608. Further details regarding the CSI and generation of information included in the CSI were discussed above, e.g., regarding the tables of FIGS. 4-5.

On the receiving side of the UE 106, signals from the BS 102 may be received via reception (Rx) circuitry 610, as selected by the duplexer 608, and decoded/demodulated for provision to the measurement generation block via decoder/demod 612, which may be used to provide the various information discussed above.

Turning to the BS 102, the measurements provided by the UE 106 may be received by Rx circuitry 652 (via the duplexer 666). This information may be decoded/demodulated via decoder/demod 654 and used to estimate BLER, e.g., via received ACK/NACKs, and also to estimate SINR, in DL BLER estimation 656 and DL SINR estimation 658. More specifically, based on the reported CQI, the BS 102 may derive the downlink (DL) SINR as seen by the UE 106. Additionally, the BS 102 may estimate the DL BLER based on the reported ACK/NACK messages from the UE 106 corresponding to the DL transmissions.

At steady-state, if the measured BLER is lower than the BLER target, a positive offset may be applied to the estimated DL SINR (derived from the reported CQI), otherwise a negative offset may be applied. In one embodiment, the offset may be set at an initial value, and changes to the offset may be applied incrementally. For example, the offset may be initially set at a default value (e.g., 0), and adjusted upwards or downwards in increments (e.g., static or variable increments) based on the measured BLER as compared to the BLER target. For example, if the BLER is lower than the BLER target, the current offset value may be increased, whereas if the BLER is higher than the BLER target, the current offset may be decreased.

The estimated DL SINR may be used to select the right (or best) MCS based on a SINR-MCS mapping available at the BS 102, using MCS selection 660. Said another way, the SINR offset may be used to adjust the DL SINR estimated from the CQI values (e.g., from the CSI). Thus, the output of the BLER and SINR estimations, along with target BLER, may be used to select a modulation and coding scheme (MCS). This MCS mapping or selection process may be referred to as "outer loop link adaptation", which may typically be based on reported CQI and estimated BLER. In turn, data may be transmitted back to the UE 106 using the selected MCS (via downlink allocation 662, Tx circuitry 664, and the duplexer 666).

Various embodiments discussed below may apply to performing BLER estimation as well as selecting MCSs, particularly after a period of high error rate, e.g., while the UE is tuned away from the network provided by the BS. The embodiments may also apply to the calculation or adjustment of CQIs or other information in the CSI by the UE.

Exemplary BLER Estimation

As described below, the method may compute a historical (or averaged) error rate which involves the current error and the immediately preceding error value. More specifically, the method may multiply the prior error value by a term alpha and the current error rate by 1-alpha. The term "alpha" is referred to herein as a smoothing factor. For the value of the current error rate, instead of using an instantaneous block error rate (BLER) value, e.g., instead of using a 1 if no acknowledge (NACK) is received and a 0 if an acknowledge is received, in one embodiment the BS may use a window averaged BLER for the new or current error value, which corresponds to a short term average of the block error rate. Thus the method may multiply the prior BLER value by a term alpha and this short term averaged (or window averaged) BLER by 1-alpha. The BS may use this resulting historical (and window averaged) block error rate (referred to herein as a historical error rate) to establish the appropriate modulation and coding schemes used by the BS for the respective UE. In particular, the method may adjust the smoothing factor (alpha) after a tune-away occurs to allow the historical error rate (historical BLER) to more quickly converge to the proper value. This is described in more detail below.

As discussed above, BLER estimation at the BS may be based on the ACK/NACK messages, e.g., corresponding to the first transmission of a hybrid automatic repeat request (HARM) process. More specifically, the BLER at time instant i may be typically filtered by an IIR filter as follows:

$$BLER_i = \alpha BLER_{i-1} + (1-\alpha) 1_{\{NACK_i\}}$$

where 1 (Nack_i) is an indicator function that takes a value of 1 if a NACK is reported at time i, and 0 otherwise. The term alpha, above, may be referred to as a "forgetting factor", a "smoothing factor", or a "feedback filter coefficient", although the formula using such a factor/coefficient may vary from that above (e.g., such as in the one below). A typical value of alpha for such embodiments may be 0.95 or 0.98.

Using the above filtering, since BLER estimation block may take discrete values (1 or 0) as input, the estimation has a large variation at convergence. Typically, to reduce this variation, a large value of alpha is chosen for the IIR filter, which may slow the convergence of the BLER estimation and delay the resumption of the MCS allocated to the UE.

However, in order to improve the accuracy and reduce the variance of the BLER estimation, a sliding window filter may be used to estimate the short term BLER. Thus, rather than using the above equation, the method may use the equation below:

$$BLER_i = \alpha BLER_{i-1} + (1-\alpha)\overline{BLER_i}$$

$$\overline{BLER_i} = \frac{1}{L} \sum_{j=i-L+1}^{i} 1_{(NACK_j)}$$

where L is the size of the sliding window.

Thus this method does not use a "1" (ACK) or a "0" (NACK) as the new BLER value, but rather uses a windowed average of previous BLER values as the new BLER value (referred to as BLER "bar"). Thus, after a tune-away/long fade environment (among other possibilities), the BLER estimation is designed to converge more quickly, which facilitates resumption of the appropriate modulation and coding scheme more quickly. In one embodiment, the convergence may be increased by using a decreased value of alpha (a different offset adjustment) initially, until a threshold BLER (e.g., a target BLER) is reached, and then the default value may be used. For example, the initial alpha value may be 0.8, e.g., during the time that high BLERs are experienced, and may be decreased to 0.95 or 0.98 upon reaching normal BLERs (e.g., less than 40% or nearing a target BLER, such as 10%). Such changes may be particularly applicable to the second BLER formula above. Note that convergence may scale according to 1/(1-alpha).

Figure 8:
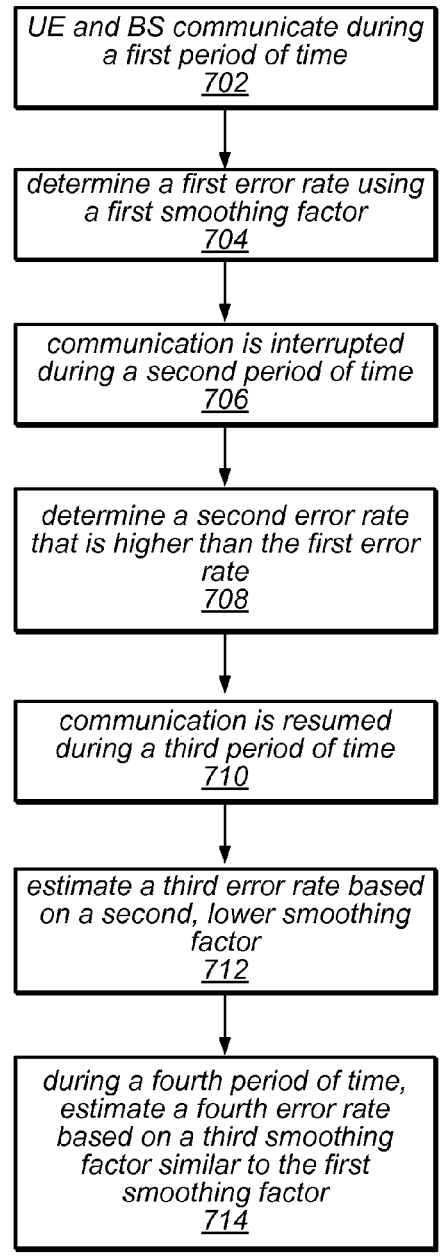
FIG. 8 is a flowchart diagram illustrating one embodiment of a method for estimating BLER.

FIG. 8—Estimating Error Rate

FIG. 8 illustrates one embodiment of a method for estimating error rate (e.g., BLER). The method shown in FIG. 8 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 702, during a first period of time, a UE and BS may be in communication on a first wireless network (e.g., an LTE wireless network). During this period of time, wireless communication may be performed in a normal fashion, e.g., where error rates vary around a target error rate without substantial variation (e.g., without error rates exceeding 60%).

Accordingly, in 704, a first error rate may be estimated, e.g., based on ACKs and/or NAKCs received from the UE. In one embodiment, the error rate may be estimated according to the formulas discussed above (in those cases, for estimating BLER). As indicated above, during the first time, the communication may be performed in a normal fashion with error rates being relatively low or near a target error rate. Accordingly, the forgetting factor or smoothing factor, e.g., the value of alpha in the above equations, may be relatively high. When this smoothing factor (e.g., a IIR filter coefficient) is high, the weight of prior error rates may have a larger impact on the estimated error rate, thereby providing more stability to the estimated error rate over time.

In 706, during a second period of time after the first period time (e.g., immediately after), communication between the UE and the BS may be interrupted. For example, the UE may tune away to a second wireless network (e.g., a CDMA wireless network). In some embodiments, the UE may use a same radio or transceiver for the two wireless networks. Accordingly, during this tune away period, the UE may not communicate with the BS on the first network, and may therefore not provide CQI values to the BS or provide ACKs and/or NACKs to transmissions by the BS. Alternatively, or additionally, the UE may encounter some other temporary communication loss between the UE and the BS, e.g., due to a long fading environment or long fade. Other losses of synchronization are envisioned.

Accordingly, in 708, during the second period of time, a second error rate may be estimated as being high (e.g., 100%), substantially higher than the first error rate (e.g., 50-100% higher). For example, the UE may not respond or provide any ACKs and/or NACKs, and the BS may therefore calculate a 100% error rate during the second period of time.

In 710, during a third period of time after the second period time (e.g., immediately after), the UE and the BS may resume communication (e.g., after the tuning away period). During this period, the UE may provide ACKs and/or NACKs, and the current error rate may be back to normal levels. However, the estimated error rate, which is based on prior error rates, may be abnormally high, due to the error rates in the second period of time.

Accordingly, in 712, the smoothing factor may be decreased in estimating error rates. By decreasing the smoothing factor, the error rate may weight more recent error rates (which are better) more than those of the second period. Accordingly, the error rates may converge to the more normal level at a faster rate than would be possible with a normal smoothing factor value (e.g., using 0.8 instead of 0.95 or 0.98). The decrease in smoothing factor may be based on the error rates having recently changed by a large amount, e.g., to greater than 2-4 times the target error rate (e.g., 10%). Alternatively, the smoothing factor may simply scale with higher error rates. Thus, as the error rates are higher, the smoothing factor may decrease, and similarly, as the error rates decrease, the smoothing factor may increase.

In 714, during a fourth period of time after the third period time (e.g., immediately after), the smoothing factor may be returned to a normal level, e.g., after the error rates have decreased to closer to the target error rate (e.g., less than 2-4 times the error rate, such as 40% error rate). Note that step 714 may not be necessary, e.g., depending on by how much the smoothing factor is decreased.

Exemplary Modification of SINR Offset

As discussed above, by comparing the measured BLER to the BLER target, an adjustment may be determined and applied to the offset used to estimate the DL SINR (e.g., derived from the CQI reported by the UE), which may in turn be used to select the MCS for wireless communication. Additionally, as also noted above, after a tune-away by the UE or a long fade environment (among other possible similar scenarios), the measured BLER may be 100% (or at least very high) for the entire out of sync period. Such scenarios are considered as exceptional events by the BS, since in normal periods, and assuming a steady-state, the BLER would not reach values higher than 3 or 4 times the BLER target (e.g., of 10%).

Accordingly, in order to accelerate the MCS resumption after such a situation, the BS may be configured to adjust the SINR offset by a larger amount (by a higher adjustment level) than normal, e.g., whenever the measured BLER decreases. For example, for successive good CQI reports, and if the observed BLER improves, a large SINR offset adjustment may be applied to the offset, which is in turn used to estimate the DL SINR. When the BLER reaches values nearer to the BLER target (e.g., 2-4 times the BLER target), a default (or at least smaller) adjustment may be applied to the offset value. Thus, the large adjustment value (i.e., an adjustment made with a higher adjustment level) may be used to accelerate the MCS recovery and the smaller adjustment value may then be used in order to improve the accuracy of the MCS selection.

In one embodiment, the SINR offset adjustment may be proportional to the observed BLER. For example, if the observed BLER is high, a large offset adjustment may be used in both directions (to increase the DL SINR, in case the BLER is improving, or to decrease the DL SINR in case the BLER is deteriorating). At steady-state, the BLER is oscillating around the BLER target (typically a small value), hence the SINR offset adjustment is small.

The following provides an example of one embodiment of such an operation:

1) Initially, a UE and BS may be successfully communicating with a low measured BLER, and the offset applied to the reported SINR (as determined by the CQI value) may be 0.

2) The UE may temporarily tune away to a different network, causing high BLER (e.g., 100% during the tuning period), as measured by the BS (since the UE is not receiving messages or sending ACKs or NACKs during that period). During this period, the offset value may be adjusted downward, e.g., from 0 to −6 over several periods, as the BLER increases from near the target value (e.g., 10%) to a high value (e.g., 100%).

3) After the tuning period, the UE may again begin communicating with the BS, including sending ACKs and NACKs. This communication may result in lower instantaneous BLER values, but the BLER value including historic error rates may remain elevated. During this period, the UE may send a CQI value of 13 (e.g., indicating a SINR of 26), but the offset may currently be set at −6, resulting in an adjustment to the SINR down to 20 dB instead of 26 dB.

4) As the UE continues to report CQI values of 13, the current BLER values are low, and the historic BLER value begins to decrease, the offset may be adjusted upward. As described above, this offset adjustment may be larger than normal, e.g., 2 dB adjustments instead of 0.2 dB adjustments. Accordingly, the offset may be adjusted from −6 to −4, giving a SINR value of 22 instead of 20).

5) The offset adjustment may change, depending on the BLER values. For example, from 80-100% BLER, the adjustment may be large (e.g., 2 dB); from 65-80% the adjustment may be smaller (e.g., 1 dB); from 55-65%, the adjustment may be smaller still (e.g., 0.5 dB); and from 0-45%, the adjustment may return to steady state values (e.g., 0.2 dB).

Thus, in the example above, the offset may adjust the offset to SINR quickly at high BLER values and slower at lower BLER values. This adjustment may allow for faster convergence after a loss of synchronization or tune-in period, e.g., allowing the UE to communicate in a more efficient manner more quickly than in prior systems. This operation may work in the opposite manner as well (i.e., higher negative changes as the BLER increases to higher levels). Thus, the larger offset adjustment may be used for convergence while the smaller offset adjustment may be used for precision.

Note that the exemplary error rates and adjustment values discussed above are exemplary only and do not limit any of the embodiments described herein. Additionally, the offset adjustments may be determined according to a table, a function taking BLER as input (e.g., linear, exponential, continuous, discreet, etc.), or any of various relationships.

Figure 9:
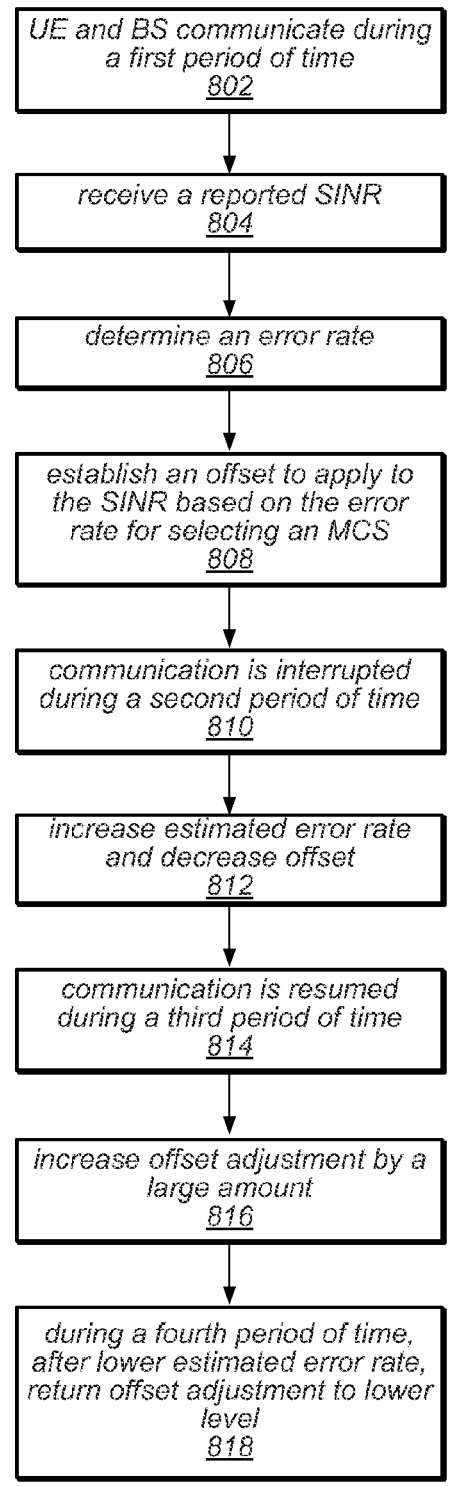
FIG. 9 is a flowchart diagram illustrating one embodiment of a method for adjusting SINR for a UE.

FIG. 9—Adjusting Reported SINR Based on Error Rate

FIG. 9 illustrates one embodiment of a method for adjusting reported SINR based on error rate. The method shown in FIG. 9 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

In 802, during a first period of time, a UE and BS may be in communication on a first wireless network (e.g., an LTE wireless network). During this period of time, wireless communication may be performed in a normal fashion, e.g., where error rates vary around a target error rate without substantial variation (e.g., without error rates exceeding 60%).

Accordingly, in 804, during this first period of time, a reported SINR may be received, e.g., by the BS from a UE. In one embodiment, the reported SINR may be provided in the form of a CQI value which may be translated to an SINR value, e.g., using a table or formula.

Additionally, in 806, during the first period of time, an error rate may be determined, e.g., by the BS for the UE. For example, the error rate may be determined based on ACKS and/or NACKs received in response to transmissions to the UE. In some embodiments, the error rate may be determined using the methods discussed above, e.g., regarding FIG. 7. Following those embodiments, during this first period of time, the feedback filter coefficient may be large, decreasing the variation in the estimated error rate.

In 808, during the first period of time, an offset may be established to estimate the SINR using the reported SINR. This offset may be based on the error rate established in 806. During operation, the offset may be adjusted up or down as the error rate varies from a target error rate.

In 810, during a second period of time after the first period time (e.g., immediately after), communication between the UE and the BS may be interrupted. For example, the UE may tune away to a second wireless network (e.g., a CDMA wireless network). In some embodiments, the UE may use a same radio or transceiver for the two wireless networks. Accordingly, during this tune away period, the UE may not communicate with the BS on the first network, and may therefore not provide CQI values to the BS or provide ACKs and/or NACKs to transmissions by the BS. Alternatively, or additionally, the UE may encounter some other temporary communication loss between the UE and the BS, e.g., due to a long fading environment or long fade. Other losses of synchronization are envisioned.

Accordingly in 812, during the second period of time, the estimated error rate may increase, e.g., to 100%, and the offset may be decreased substantially (e.g., by 6 dB), over time.

In 814, during a third period of time after the second period time (e.g., immediately after), the UE may resume communication with the BS, after the interruption during the second period of time. However, the high error rates during the second period of time may result in the error rate remaining abnormally high due to historic weighting in the error rate estimation (although the feedback filter coefficient may have been decreased to allow a faster convergence to the new, lower error rate, as discussed above). Regardless, the estimated error rate may initially be elevated and the current error rate (corresponding to the third period of time) may be low, which causes the estimated error rate to decrease over time.

Accordingly, in 816, during the third period of time, the offset may be adjusted by a large amount, e.g., by 2 dB from −6 dB to −4 dB following the example above, which may allow for the selection of a higher MCS based on the adjusted SINR than would normally be allowed by the more normal offset adjustments (e.g., 0.2 dB).

In 818, during a fourth period of time after the third period time (e.g., immediately after), estimated error rates may return to lower levels (e.g., less than 40% or 2-4× the target error rate), and offset adjustments may also be returned to lower levels (e.g., 0.2 dB). Note that the change in offset adjustment from the higher level to the lower level may be performed in a stepwise fashion (e.g., with 1-10 steps) or in a continuous fashion, as desired.

The method of FIG. 9 may be repeated for a plurality of different UEs by the BS, as desired. The above discussed method may be performed as an alternative of or in addition to the modification to the BLER estimation discussed above.

Further Embodiments

Note that in the present description, various embodiments are described in the context of LTE (Long-term evolution of UMTS). However, it is noted that the methods described herein can be generalized for CSI reporting using other wireless technologies and are not limited to the specific descriptions provided above.

Additionally, while the embodiments discussed above relate to the modification of SINR or BLER estimation methods on the BS side, the reported CQI values (or other information in the CSI) may be modified by the UE. Thus, similar embodiments apply to modification CQI values, which may be performed alternatively, or in addition to the embodiments discussed above.

Advantages

The described embodiments may provide the following advantages. In cases of network interruption or losses of synchronization, e.g., based on the UE tuning to a different radio, long fading environments, or other factors that do not reflect channel quality information, error rates detected by the BS (e.g., based on ACK/NACKs) may temporarily reach high levels (e.g., 100%). In prior systems, upon resumption to normal communication, the selected MCS combination would be too low, due to the historical weighting of the high error rate levels. More specifically, the embodiments discussed above may avoid penalizing MCS allocation when there are sequences of good CQI reports/low BLER after such an interruption, avoiding a negative impact on DL throughput.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method performed by a base station (BS) in a wireless communication system, the method comprising:
the BS communicating with a user equipment (UE);
during the BS communicating with the UE, the BS modifying a received first SINR by a first SINR offset, wherein the first SINR offset is adjusted according to a first adjustment amount based on a first historical error rate, wherein the first historical error rate is calculated by the BS during the BS communicating with the UE;
the BS losing communication with the UE after said communicating;
the BS resuming communication with the UE after said losing communication;
after the BS resuming communication with the UE, the BS modifying a received second SINR by a second SINR offset, wherein the second SINR offset is adjusted by a second adjustment amount, wherein the second adjustment amount is larger than the first adjustment amount;
wherein the second adjustment amount is used based on a second historical error rate calculated after the BS resumes communications with the UE, wherein the second adjustment amount is used based on: 1) the second historical error rate being less than an error rate calculated while the BS has lost communication with the UE, and 2) the second historical error rate being substantially higher than the first historical error rate.

2. The method of claim 1, wherein the second adjustment amount is used based on a change in the second historical error rate becoming less than an error rate calculated while the BS has lost communication with the UE.

3. The method of claim 1, wherein the second adjustment amount is used based on an amount of difference between the second historical error rate and the first historical error rate.

4. The method of claim 1, wherein the first historical error rate and the second historical error rate are each a block error rate (BLER).

5. The method of claim 1, wherein the BS modifying the received second SINR by the second SINR offset operates to more quickly improve a modulation and coding scheme that is used for the UE.

6. The method of claim 1, wherein the method is performed for a plurality of UEs.

7. A base station, comprising:
an antenna for performing wireless communication with a user equipment (UE);
a processor;
a memory medium coupled to the processor, wherein the memory medium stores program instructions that are executable by the processor to:
during the base station communicating with the UE, modify a first SINR received from the UE by a first SINR offset, wherein the first SINR offset is adjusted according to a first adjustment amount, wherein the first adjustment amount is based on a first error rate calculated by the BS during the base station communicating with the UE;
after the base station loses and resumes communication with the UE, modify a second SINR received from the UE by a second SINR offset, wherein the second SINR offset is adjusted by an adjustment amount at a second adjustment amount, wherein the second adjustment amount is larger than the first adjustment amount, wherein the second adjustment amount is used to modify the second SINR offset based on a change in a second error rate becoming less than an error rate calculated by the base station while the base station lost communication with the UE, and wherein the second adjustment amount is used while the second error rate remains substantially higher than the first error rate.

8. The base station of claim 7, wherein the program instructions operate to more quickly improve a modulation and coding scheme that is used for the UE.

9. The base station of claim 7, wherein the second adjustment amount is based on an amount of difference between the second error rate and the first error rate.

10. The base station of claim 7, wherein the first error rate and the second error rate are each a block error rate (BLER).

11. A method performed by a base station (BS), comprising:
during a first period of time, the BS communicating with a user equipment (UE) over a first network;
during the first period of time, the BS receiving a first reported SINR from the UE;
during the first period of time, the BS estimating a first error rate for the UE;

during the first period of time, establishing an offset to apply to the first reported SINR to produce a first effective SINR, wherein said establishing the offset is based on the first error rate;

during a second period of time, the BS losing communication with the UE;

during the second period of time, the BS estimating a second error rate for the UE, wherein the second error rate is substantially higher than the first error rate;

during the second period of time, the BS decreasing the offset by a substantial amount based on the estimation of the second error rate, wherein said decreasing is performed multiple times during the second period of time by an adjustment amount at a first level, wherein after said decreasing the offset, the offset is negative;

during a third period of time, the BS communicating with the UE;

during the third period of time, the BS receiving a second reported SINR from the UE, wherein the second reported SINR is similar to the first reported SINR;

during the third period of time, the BS estimating a third error rate for the UE, wherein the third error rate is substantially higher than the first error rate, but less than the second error rate;

during the third period of time, the BS adjusting the offset by an adjustment amount at a second level, wherein the second level is larger than the first level based on the third error rate being substantially higher than the first error rate, but less than the second error rate, wherein the adjustment amount at the second level is based on an amount of difference between the third error rate and the first error rate.

12. The method of claim 11, further comprising:

during a fourth period of time, the BS estimating a fourth error rate, wherein the fourth error rate is greater than the first error rate, but substantially less than the second error rate; and during the fourth period of time, the BS adjusting the offset by an adjustment amount at the first level, based on the fourth error rate being substantially less than the second error rate.

13. The method of claim 11, wherein the first error rate is less than 20%, wherein the second and third error rates are greater than 70%, wherein the fourth error rate is less than 40%.

14. The method of claim 11, wherein the reported SINR is determined by the
BS based on a channel quality indicator (CQI) value, wherein method further comprises:
estimating the downlink SINR from the CQI value.

15. The method of claim 11, wherein the error rate comprises a block error rate (BLER).

16. The method of claim 11, wherein said estimating the error rate is based on ACKs and/or NACKs received from the UE.

17. The method of claim 11, wherein the first network comprises a long term evolution (LTE) network.

18. A method performed by a base station (BS), comprising:

the BS communicating with the UE, wherein during the BS communicating with the UE, the method comprises:

the BS receiving a first SINR from the UE;

the BS modifying the first SINR by a first SINR offset, wherein the first SINR offset is adjusted according to a first adjustment amount, wherein the first SINR offset is based on a first error rate calculated by the BS during the BS communicating with the UE;

the BS losing communication with the UE after said communicating;

during the BS losing communication with the UE, the BS calculating a second error rate, wherein the second error rate is substantially higher than the first error rate;

the BS resuming communication with the UE after said losing communication, wherein after the BS resuming communication with the UE the method comprises:

the BS receiving a second SINR from the UE;

the BS adjusting the second SINR by a second SINR offset, wherein the second SINR offset is adjusted by a second adjustment amount, wherein the second SINR offset is based on a third error rate calculated by the BS after resuming communication with the UE, wherein the second adjustment amount is larger than the first adjustment amount, and wherein the second adjustment amount is based on the third error rate being substantially higher than the first error rate, but less than the second error rate.

19. The method of claim 18, wherein the second adjustment amount is based on an amount of difference between the third error rate and the first error rate.

20. The method of claim 18, wherein the first, second, and third error rates are each a block error rate (BLER).

* * * * *